(12) United States Patent
Kang

(10) Patent No.: US 11,156,304 B2
(45) Date of Patent: Oct. 26, 2021

(54) CHECK VALVE

(71) Applicant: MANDO CORPORATION, Gyeonggi-do (KR)

(72) Inventor: Kiwon Kang, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/424,402

(22) Filed: May 28, 2019

(65) Prior Publication Data

US 2019/0368622 A1 Dec. 5, 2019

(30) Foreign Application Priority Data

May 30, 2018 (KR) .................. 10-2018-0061588

(51) Int. Cl.
*F16K 15/02* (2006.01)
*F16K 25/00* (2006.01)
(Continued)

(52) U.S. Cl.
CPC .......... *F16K 15/025* (2013.01); *F16K 25/005* (2013.01); *F16K 27/0209* (2013.01);
(Continued)

(58) Field of Classification Search
CPC ...... F16K 15/04; F16K 15/025; F16K 25/005; F16K 27/0209; F16K 15/026; F16K 15/063; F16K 15/06; F16K 1/42; F16K 1/422; Y10T 137/7939; Y10T 137/7936; Y10T 137/7938; Y10T 137/7934; Y10T 137/7504; Y10T 137/7559; Y10T 137/7668; Y10T 137/7922;
(Continued)

(56) References Cited

U.S. PATENT DOCUMENTS 1,861,420 A * 5/1932 Mahan ................ F04B 53/1027
137/516.29
1,964,249 A * 6/1934 Chase ................... F16K 15/025
251/332
(Continued)

FOREIGN PATENT DOCUMENTS

| CA | 2214820 A1 * | 3/1999 | .......... F04B 53/1087 |
| JP | 10-103581 | 4/1998 | |
| JP | 2015-200333 | 11/2015 | |

*Primary Examiner* — Craig J Price
(74) *Attorney, Agent, or Firm* — Ladas & Parry, LLP

(57) ABSTRACT

A check valve provided in a bore of a modulator block having inlet and outlet passages comprises a valve housing having an upper portion and a seat portion formed with a lower portion of the valve housing and having inlet and outlet ports communicating with the inlet and outlet passages, respectively; a cap sealing the upper portion of the valve housing and secured to the modulator block; a plunger movable up and down in the valve housing to open and close an internal flow passage between the inlet and outlet ports; an elastic member provided between the cap and the plunger and elastically pressing the plunger against the seat portion; a sealing member installed on the plunger; and an anti-jamming member provided between the sealing member and a contact surface to prevent the sealing member from being caught in the contact surface between the plunger and the seat portion.

9 Claims, 5 Drawing Sheets

(51) Int. Cl.
*F16K 27/02* (2006.01)
*F16K 15/04* (2006.01)

(52) U.S. Cl.
CPC ......... *F16K 15/04* (2013.01); *Y10T 137/7934* (2015.04); *Y10T 137/7936* (2015.04)

(58) Field of Classification Search
CPC ........... Y10T 137/7929; F04B 53/1027; F04B 53/1022; F04B 53/103; F04B 53/1032; F04B 53/1087
USPC .... 137/543.13, 543.21, 543.17, 543.23, 491; 251/333
See application file for complete search history.

(56) References Cited

U.S. PATENT DOCUMENTS

| | | | | |
|---|---|---|---|---|
| 2,143,399 | A * | 1/1939 | Abercrombie | F04B 53/1022 137/540 |
| 2,233,649 | A * | 3/1941 | Stahl | F16K 15/063 137/543.13 |
| 2,304,991 | A * | 12/1942 | Foster | F04B 53/1027 137/454.4 |
| 2,448,429 | A * | 8/1948 | Henry | F16K 1/46 137/68.28 |
| 2,792,016 | A * | 5/1957 | Shellman | F16K 1/46 137/516.29 |
| 2,898,082 | A * | 8/1959 | Von Almen | F04B 53/1087 251/333 |
| 3,051,348 | A * | 8/1962 | Redman | F04B 53/1027 220/304 |
| 3,211,174 | A * | 10/1965 | Weise | F16K 17/105 137/469 |
| 3,259,075 | A * | 7/1966 | Roth | F04B 53/007 92/169.1 |
| 3,330,527 | A * | 7/1967 | Nurkiewicz | A62C 13/003 251/114 |
| 3,640,501 | A * | 2/1972 | Walton | F16K 1/385 251/332 |
| 4,039,003 | A * | 8/1977 | Cheek | F16K 15/025 137/516.29 |
| 4,228,987 | A * | 10/1980 | Potter | F16K 1/34 251/210 |
| 4,350,176 | A * | 9/1982 | Lace | F16K 17/04 137/242 |
| 4,518,329 | A * | 5/1985 | Weaver | F04B 53/1027 137/516.25 |
| 4,932,434 | A * | 6/1990 | Taylor | F16K 17/06 137/469 |
| 4,936,339 | A * | 6/1990 | Bennett | F16K 15/025 137/454.6 |
| 5,062,452 | A * | 11/1991 | Johnson | F04B 53/1027 137/533.25 |
| 5,088,521 | A * | 2/1992 | Johnson | E21B 21/01 137/516.29 |
| 5,193,577 | A * | 3/1993 | de Koning | F04B 53/102 137/516.29 |
| 5,275,204 | A * | 1/1994 | Rogers | F04B 53/1027 137/516.29 |
| 6,095,183 | A * | 8/2000 | Taylor | F16K 17/06 137/475 |
| 6,161,570 | A * | 12/2000 | McNeely | G05D 16/166 137/491 |
| 7,337,796 | B2 * | 3/2008 | Choate | F16K 17/04 137/15.19 |
| 7,537,194 | B2 * | 5/2009 | Nagai | F16K 1/38 251/122 |
| 7,546,849 | B2 * | 6/2009 | Staggs | F04B 53/102 137/540 |
| 8,413,955 | B1 * | 4/2013 | Rooney | F16K 1/422 251/171 |
| 8,523,144 | B2 * | 9/2013 | Pechtold | F16K 1/46 251/176 |
| 9,470,226 | B2 * | 10/2016 | Johnson | F16K 15/06 |
| 10,001,221 | B2 * | 6/2018 | Schmit | F16K 1/46 |
| 10,240,597 | B2 * | 3/2019 | Bayyouk | F04B 53/16 |
| 10,648,580 | B2 * | 5/2020 | Jeon | B60T 8/341 |
| 10,767,773 | B2 * | 9/2020 | Lee | F16K 27/0209 |
| 10,774,828 | B1 * | 9/2020 | Smith | F04B 53/1087 |
| 10,815,989 | B2 * | 10/2020 | Naedler | F04B 53/22 |

\* cited by examiner

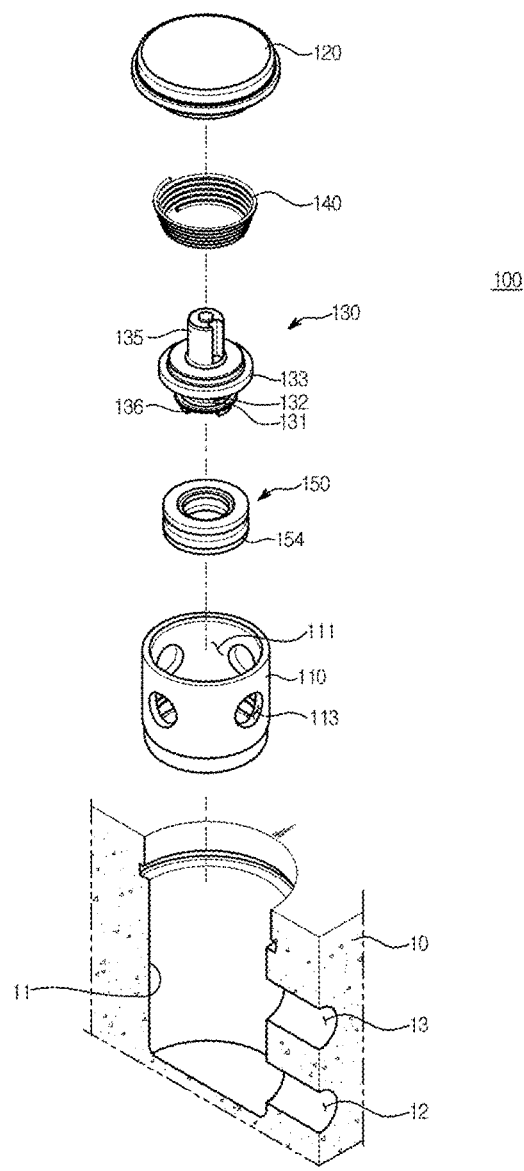
[Fig. 1]

[Fig. 2]
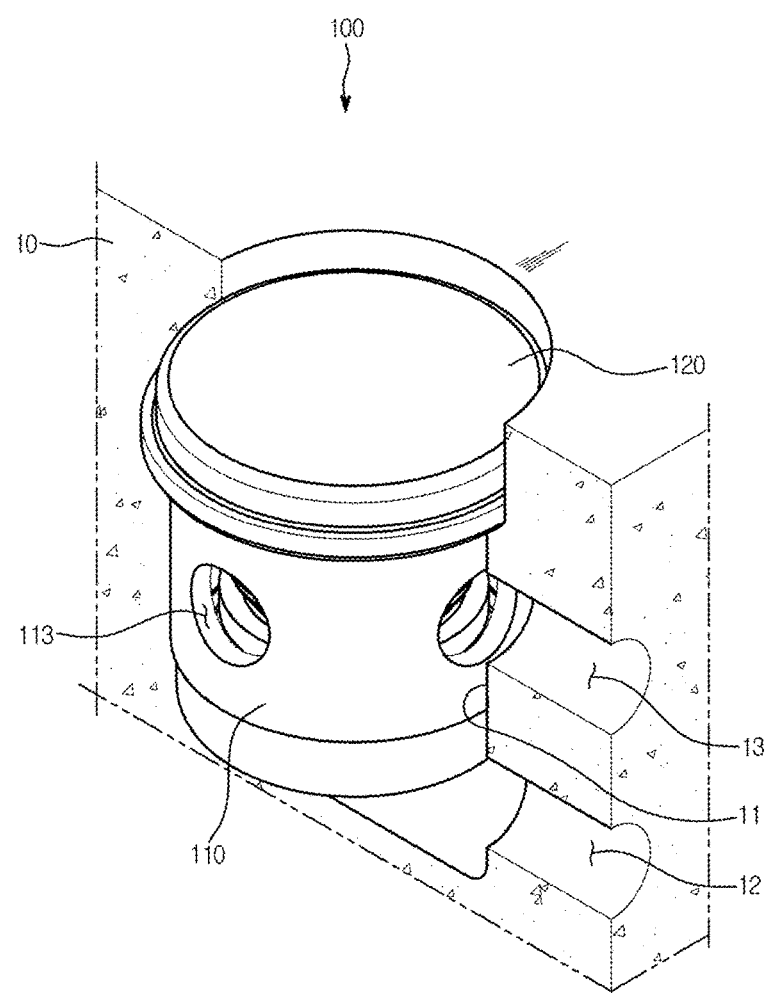

[Fig. 3]
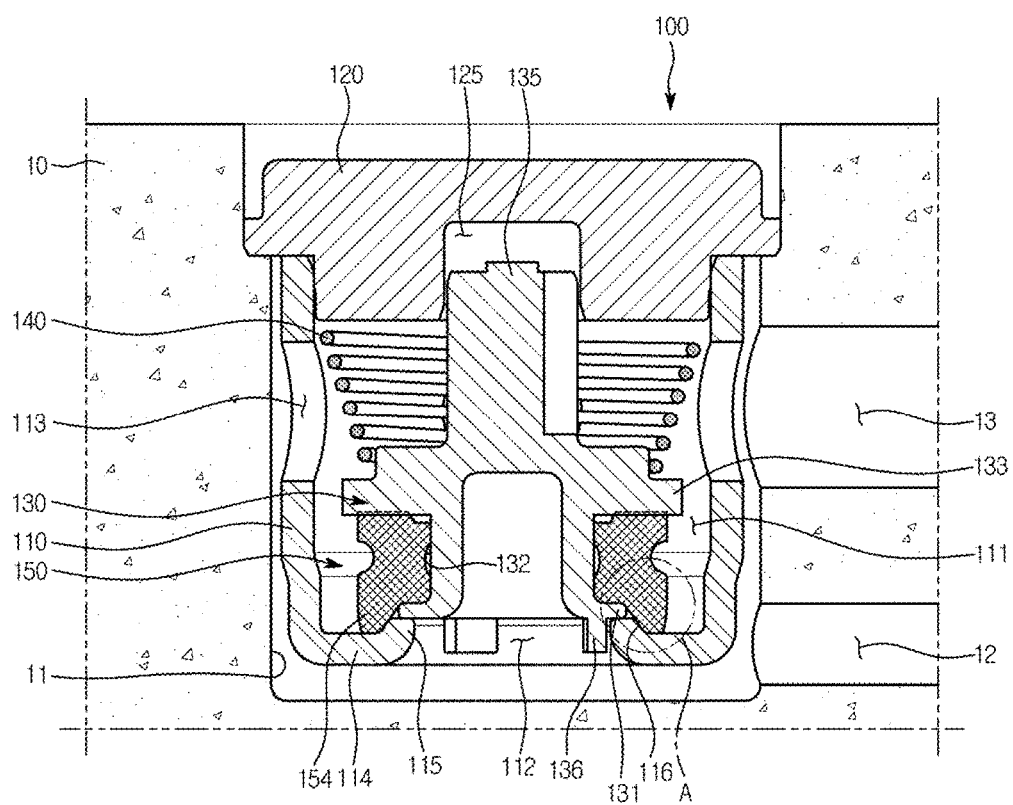

[Fig. 4]
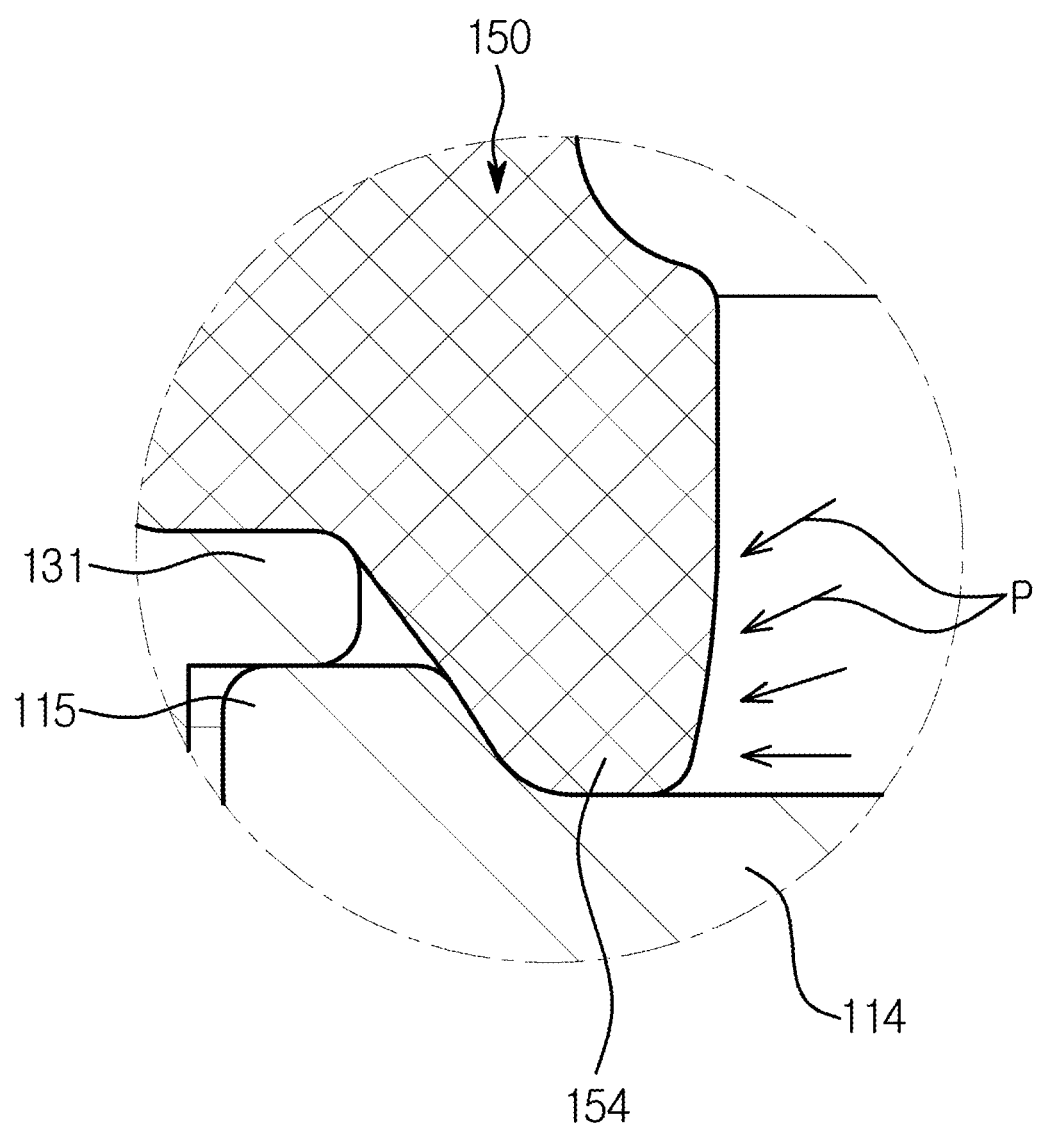

[Fig. 5]
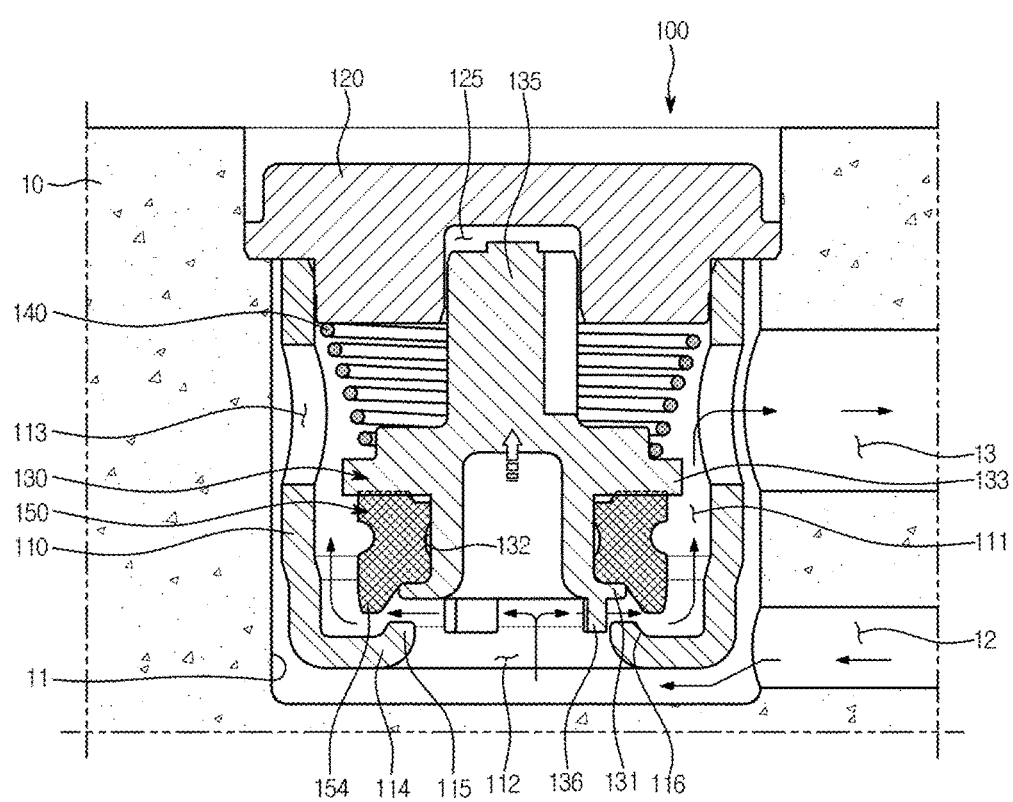

CHECK VALVE

CROSS-REFERENCE TO RELATED APPLICATION(S)

This application is based on and claims priority under 35 U.S.C. § 119 to Korean Patent Application No. 10-2018-0061588, filed on May 30, 2018, in the Korean Intellectual Property Office, the disclosure of which is incorporated herein by reference in its entirety.

BACKGROUND

1. Technical Field

The present disclosure relates to a check valve, and more particularly, to a check valve provided in a hydraulic passage of an electronically controlled brake system.

2. Description of the Related Art

In general, check valves are used in various fields with a configuration allowing only the one-way flow of oil. For example, a check valve may be provided in an electronically controlled brake system that controls the flow of oil so as to control the hydraulic pressure of a wheel cylinder. That is, the check valve can be installed and used in a suitable location of a flow passage formed in a modulator block of the electronically controlled brake system.

Such check valve may be classified into a ball type that controls the one-way flow of oil using a ball and a seal type that controls the one-way flow of oil by providing a sealing member to a plunger. In the case of the ball type check valve, an orifice is blocked by the ball, which is simpler in structure than the seal type check valve and is advantageous in terms of durability but has a disadvantage in that the sealing performance is inferior. The check valve of the seal type is designed to shut down the flow passage to prevent the flow of oil when the sealing member installed on the plunger is moved by hydraulic pressure and contacts a valve housing. Therefore, in the case of a brake system where the sealing performance is important, the seal type check valve structure having excellent sealing performance is adopted.

However, in the case of the seal type check valve, the sealing member is pressed by the hydraulic pressure and pushed into a gap between the plunger and the valve housing when preventing the oil from returning into the valve. This repetitive operation causes the sealing member to become trapped and jammed in the gap between the plunger and the valve housing, which prevents smooth sealing performance. Meanwhile, when a distance between the plunger and the valve housing is increased, deformation of the sealing member made of the rubber material may be changed depending on the operating environment, such as temperature and humidity, and the sealing function may become impossible.

SUMMARY

It is an aspect of the present disclosure to provide a check valve that prevents a sealing member, which blocks the flow of oil, from being caught in a gap between a plunger and a valve housing and becoming damaged, thereby maintaining stable sealing performance.

Additional aspects of the present disclosure will be set forth in part in the description which follows and, in part, will be obvious from the description, or may be learned by practice of the disclosure.

In accordance with one aspect of the present disclosure, there may be provided a check valve provided in a bore of a modulator block having an inlet passage and an outlet passage to control the one-way flow of oil including: a valve housing having an upper portion opened and a seat portion formed integrally with a lower portion of the valve housing and having an inlet port communicating with the inlet passage, and an outlet port communicating with the outlet passage formed around a side circumference; a cap to seal the open top of the valve housing and to be secured to the modulator block; a plunger movable up and down in the valve housing to open and close an internal flow passage between the inlet port and the outlet port; an elastic member provided between the cap and the plunger and elastically pressing the plunger against the seat portion; a sealing member installed on the plunger and brought into close contact with the seat portion when the plunger contacts the seat portion to close the internal flow passage; and an anti-jamming member provided between the sealing member and a contact surface to prevent the sealing member deformed by hydraulic pressure from being caught in the contact surface between the plunger and the seat portion.

Further, the check valve may include the anti-jamming member protruded from the seat portion so as to face the sealing member when the sealing member is pressed by the hydraulic pressure generated from the outlet passage in a state where the plunger and the seat portion are in contact with each other.

Further, the check valve may include the anti-jamming member includes an inclined surface provided on the seat portion.

Further, the check valve may include the inclined surface protruded inward from the seat portion.

Further, the check valve may include the seat portion having a stopper protruding toward the plunger along the circumference forming the inlet port, and a flange extending radially from a lower end of the plunger and contacting the stopper.

Further, the check valve may include a mounting portion recessed along a circumferential direction provided on a side circumference of the plunger positioned at an upper end of the flange so that the sealing member is installed, and the sealing member installed to the mounting portion has a sealing portion protruding lower than the flange.

Further, the check valve may include the stopper formed to be positioned on the side opposite to an outer side surface of the sealing portion, and the sealing portion is configured to be brought into close contact with the outer surface of the stopper and the seat portion when the flange contacts the stopper.

Further, the check valve may include guide portions for guiding a stable linear movement of the plunger provided at both upper and lower ends of the plunger.

Further, the check valve may include a guide groove formed in the lower portion of the cap toward the upper side so as to have a predetermined length, wherein the guide portions include a guide rod extending upward from an upper surface of the plunger and slidably moving in contact with an inner circumferential surface of the guide groove, and a plurality of guiding protrusions extending downward from a lower surface of the plunger so as to be slidably in contact with an inner circumferential surface of the inlet port.

Further, the check valve may include a supporting protrusion extending radially to support a lower end of the elastic member provided at an upper end of the plunger.

BRIEF DESCRIPTION OF THE DRAWINGS

The present disclosure will be described in detail with reference to the following drawings, which illustrate preferred embodiments of the present disclosure, and thus the technical idea of the present disclosure should not be construed as being limited thereto.

FIG. 1 is an exploded perspective view showing a state in which a check valve according to an embodiment of the present disclosure is installed in a modulator block.

FIG. 2 is an assembled perspective view of FIG. 1.

FIG. 3 is a cross-sectional view showing a check valve according to an embodiment of the present disclosure.

FIG. 4 is an enlarged view of a portion A in FIG. 3.

FIG. 5 is a view showing an operational state of a check valve according to an embodiment of the present disclosure.

DETAILED DESCRIPTION

Hereinafter, the embodiments of the present disclosure will be described in detail with reference to accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is an exploded perspective view showing a state in which a check valve according to an embodiment of the present disclosure is installed in a modulator block, FIG. 2 is an assembled perspective view of FIG. 1, FIG. 3 is a sectional view showing a check valve according to an embodiment of the present disclosure, and FIG. 4 is an enlarged view of portion A in FIG. 3.

Referring to FIGS. 1 to 4, a check valve 100 according to an aspect of the present disclosure includes a valve housing 110, a cap 120, a plunger 130, an elastic member 140, and a sealing member 150. The check valve 100 is integrally assembled from the outside and may be mounted on a bore 11 having an inlet passage 12 and an outlet passage 13 formed in a modulator block 10.

The valve housing 110 has a cylindrical shape with an open upper portion thereof. The valve housing 110 is formed with an inlet port 112 and an outlet port 113 communicating with the inlet passage 12 and the outlet passage 13 formed in the modulator block 10, respectively. More specifically, a seat portion 114 having the inlet port 112 communicating with the inlet passage 12 may be integrally formed at a lower portion of the valve housing 110. A plurality of the outlet ports 113 communicating with the outlet passage 13 may be formed on a side surface of the valve housing 110 so as to be spaced apart from each other along the side circumferential direction.

The seat portion 114 is provided integrally with the lower portion of the valve housing 110 to support the plunger 130, which will be described later. The seat portion 114 is provided with the plunger 130, that is, a stopper 115 formed to protrude upward, around the circumference of the inlet port 112. The seat portion 114, the stopper 115, and the valve housing 110 are integrally formed.

The stopper 115 protrudes from the seat portion 114 in the direction of the plunger 130 to prevent the sealing member 150 from being caught (or jammed) between the plunger 130 and the seat portion 114. The structure for preventing the sealing member 150 from being caught by the stopper 115 will be described below again.

The cap 120 seals the open upper portion of the valve housing 110 and is secured to the modulator block 10, More specifically, a guide groove 125 into which a guide rod 135 formed in the plunger 130 to be described later is inserted is formed in a lower portion of the cap 120. The guide groove 125 is formed to have a predetermined length from the lower portion of the cap 120 toward the upper side. The guide groove 125 guides the plunger 130 when the plunger 130 moves, so that the plunger 130 may stably move forward and backward.

The plunger 130 moves up and down in the valve housing 110 to open and close an internal flow passage 111 between the inlet port 112 and the outlet port 113. The plunger 130 may have a multi-step shape having different diameters along its length direction. For example, the plunger 130 may be provided with a flange 131, a mounting portion 132 on which the sealing member 150 is mounted, and a supporting protrusion 133 on which the elastic member 140 is supported, from the lower side to the upper side.

The flange 131 extends radially from a lower end of the plunger 130 to be in contact with the stopper 115. The flange 131 is brought into contact with an upper surface (seat surface) of the stopper 115 of the seat portion 114 by a lower surface (flange surface) to close the internal flow passage 111 to prevent the oil from flowing backward.

The supporting protrusion 133 extends radially from an upper end of the plunger 130 to support a lower end of the elastic member 140. The plunger 130 is elastically pressed by the elastic member 140 supported by the supporting protrusion 133. That is, an upper end of the elastic member 140 is supported by the cap 120 and a lower end is supported by the supporting protrusion 133 to elastically press the plunger 130 downwardly so that the flange 131 contacts the stopper 115.

The mounting portion 132 may be recessed along a side circumference of the plunger 130. The mounting portion 132 is provided between the flange 131 and the supporting protrusion 133.

The sealing member 150 is installed in the mounting portion 132 and may be made to be in close contact with the seat portion 114 when the plunger 130 closes the internal flow passage 111. The sealing member 150 is formed in a ring shape as an elastic body such as rubber and has a sealing portion 154 that protrudes lower than the flange 131 when fitted and coupled to the mounting portion 132.

The sealing portion 154 protrudes downward from an outer surface of the sealing member 150 mounted to the mounting portion 132. The stopper 115 is formed to be positioned opposite to the outer surface of the sealing portion 154, i.e., on an inner surface of the sealing member 150. Therefore, when the plunger 130 moves downward and the flange 131 is in contact with the stopper 115, the sealing portion 154 of the sealing member 150 is brought into close contact with a lower surface of the seat portion 114 to perform a sealing function, in which case the sealing portion 154 is brought into close contact with an inclined surface 116, which is an anti-jamming member provided outside the stopper 115. Even if the sealing portion 154 of the sealing member 150 is elastically deformed by the hydraulic pressure generated when the oil flows backward, the sealing portion 154 is supported by the inclined surface 116 of the stopper 115, so it is effectively prevented that the sealing portion is caught in a contact surface between the plunger 130 and the seat portion 114, in other words a gap between the flange 131 and the stopper 115.

Further, the flange 131 contacts the stopper 115 to restrict the movement of the plunger 130, thereby preventing excessive elastic deformation of the sealing member 150.

In this embodiment, the anti-jamming member is exemplified as an inclined surface provided on the seat portion, but the present disclosure is not limited to this, and the anti-jamming member may also be provided in the form of a bent step or a groove. Further, the anti-jamming member may have various types of protrusion protruding from the seat portion 114 so as to face the sealing member 150 when the sealing member 150 is pressed by the hydraulic pressure generated from the outlet passage 13 in a state where the plunger 130 and the seat portion 114 are in contact with each other.

Guide portions 136 are provided on both upper and lower ends of the plunger 130 so that the plunger 130 may stably move up and down within the valve housing 110 and achieve quick response performance.

The guide portions include the guide rod 135 formed on an upper surface of the plunger 130 and a plurality of the guide protrusions 136 formed on the lower surface of the plunger 130.

The guide rod 135 extends upward from the upper surface of the plunger 130. The guide rod 135 is inserted into the guide groove 125 formed in the cap 120 and may slide in contact with an inner circumferential surface of the guide groove 125.

The plurality of guide protrusions 136 are provided on the lower surface of the plunger 130 and extend downward. The guide protrusion 136 may slide in contact with an inner circumferential surface of the inlet port 112. That is, the plurality of guide protrusions 136 may be spaced apart from the lower surface of the plunger 130 along the circumferential direction corresponding to the diameter of the inlet port 112. The guide protrusions 136 have a structure for guiding the movement of the plunger 130 and have a shape and a size that does not block the inlet port 112 as the inlet port 112 is used. For example, the guide protrusions 136 are provided at three equal intervals along the circumferential direction of the inlet port 112, but the present disclosure is not limited thereto, and the number thereof may be selectively increased or decreased if they can be stably guided.

Meanwhile, the guide rod 135 and the guide protrusions 136 respectively formed on the upper and lower portions of the plunger 130 may have operating ranges that do not deviate from the guide groove 125 and the inlet port 112 when the plunger 130 moves up and down.

The operational state of the check valve 100 having the above structure will now be described with reference to FIGS. 3 to 5.

FIG. 5 is a view showing an operational state of a check valve according to an embodiment of the present disclosure.

As shown in FIG. 5, the oil flows into the inlet port 112 of the valve housing 110 through the inlet passage 12. When the pressure of the inflow oil is larger than the elastic force of the elastic member 140, the plunger 130 moves upward to open the internal flow passage 111 of the valve housing 110. As the inlet port 112 and the outlet port 113 are communicated with each other, the oil is discharged into the outlet passage 13. The plunger 130 may be stably linearly moved by the guide portions 135 and 136 provided at both ends of the plunger 130, so that a quick response may be secured according to stability of the movement.

When the pressure of the oil becomes smaller than the elastic force of the elastic member 140, as shown in FIG. 3, the plunger 130 is pressed by the elastic member 140 and moved downward toward the seat portion 114. As a result, when the plunger 130 is moved, the sealing portion 154 of the sealing member 150 is first brought into contact with the seat portion 114 to perform primary sealing, and in turn the lower surface of the flange 131 of the plunger 130 contacts the stopper 115, and secondary sealing is performed. At this time, the plunger 130 may prevent excessive deformation of the sealing member 150 as the travel distance is limited by the stopper 115.

Meanwhile, the sealing portion 154 of the sealing member 150 is pressed by the hydraulic pressure generated from the outlet passage 13 while the flange 131 is in contact with the stopper 115. That is, it is pressed inward by the pressure exerted on the outside of the sealing portion 154 as shown by arrow P indicating the direction of pressure action of the oil shown in FIG. 4. An inner surface of the stopper 115 is held in close contact with the inclined surface 116, which is the anti-jamming member provided on the outer surface of the stopper 115, in a state where the sealing portion 154 is in contact with the seat portion 114, and thus it is possible to prevent the sealing portion 154 from being jammed by the gap between the stopper 115 and the flange 131. Therefore, it is possible to provide a stable sealing performance by eliminating the problem in which the existing sealing member is slit through the gap between the components.

The check valve according to an embodiment of the present disclosure may prevent breakage of the sealing member by blocking the sealing member deformed by the hydraulic pressure when the back flow of the oil is blocked by the anti-jamming member preventing the plunger from being caught by the gap between the plunger and the valve housing. Thus, it is possible to maintain stable sealing performance.

Further, as the plunger for selectively opening and closing the internal flow passage may be stably moved, the reactivity according to the stability of the movement is excellent.

Further, the embodiments of the present disclosure improve the sealing performance of the check valve according to the double sealing structure.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A check valve provided in a bore of a modulator block having an inlet passage and an outlet passage to control one-way flow of oil, comprising:
   a valve housing having an upper portion opened and a seat portion formed integrally with a lower portion of the valve housing and having an inlet port communicating with the inlet passage, and an outlet port communicating with the outlet passage formed around a side circumference;
   a cap configured to seal the upper portion of the valve; housing and to be secured to the modulator block;
   a plunger configured to be movable up and down in the valve housing to open and close an internal flow passage between the inlet port and the outlet port;
   an elastic member provided between the cap and the plunger and elastically pressing the plunger against the seat portion;

a sealing member installed on the plunger and brought into close contact with seat portion when the plunger contacts the seat portion to close the internal flow passage; and a stopper extended from the seat portion to prevent the sealing member from being caught between the plunger and the seat portion, wherein:

the stopper protrudes toward the plunger along a circumference forming the inlet port, a flange extending radially from a lower end of the plunger and contacting the stopper, a mounting portion recessed along a circumferential direction is provided on a side circumference of the plunger positioned at an upper end of the flange so that the sealing member is installed, and the sealing member installed to mounting portion has a sealing portion protruding lower than the flange.

2. The check valve according to claim 1,
wherein the stopper is protruded from the seat portion so as to face the sealing member when the sealing member is pressed by the hydraulic pressure generated from the outlet passage in a state where the plunger and the seat portion are in contact with each other.

3. The check valve according to claim 2,
wherein the stopper includes an inclined surface provided on the seat portion.

4. The check valve according to claim 1,
wherein the stopper includes an inclined surface provided on the seat portion.

5. The check valve according to claim 4,
wherein the inclined surface is protruded inward from the seat portion.

6. The check valve according to claim 1,
wherein the stopper is formed to be positioned on a side opposite to an outer side surface of the sealing portion, and the sealing portion is configured to be brought into close contact with an outer surface of the stopper and the seat portion when the flange contacts the stopper.

7. The check valve according to claim 1,
wherein guide portions for guiding a stable linear movement of the plunger are provided at both upper and lower ends of the plunger.

8. The check valve according to claim 7,
wherein a guide groove is formed in a lower portion of the cap toward an upper side so as to have a predetermined length, and wherein the guide portions include a guide rod extending upward from an upper surface of the plunger and slidably moving in contact with an inner circumferential surface of the guide groove, and a plurality of guiding protrusions extending downward from a lower surface of the plunger so as to be movable within an inner circumferential surface of the inlet port.

9. The check valve according to claim 1,
a supporting protrusion extending radially to support a lower end of the elastic member is provided at an upper end of the plunger.

\* \* \* \* \*